May 13, 1930.                    F. C. MORRIS                    1,758,712
ANTIRATTLING BUSHING
Filed Sept. 13, 1924
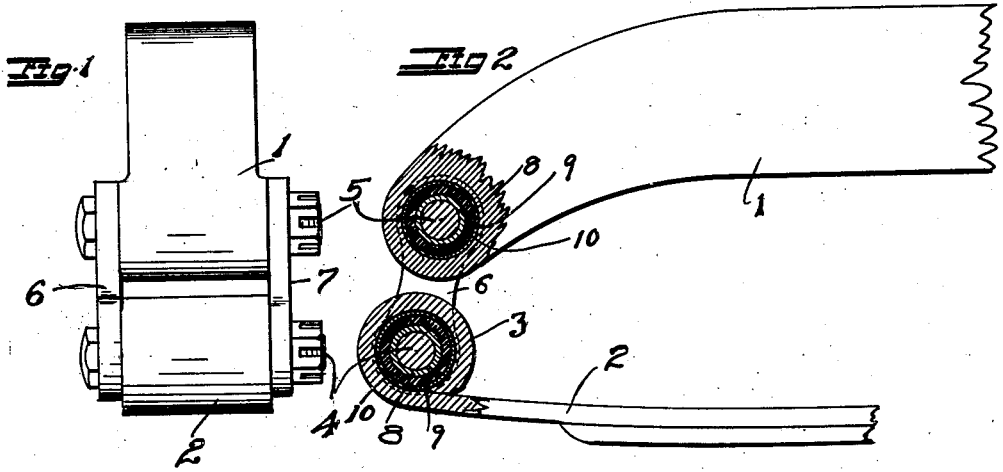
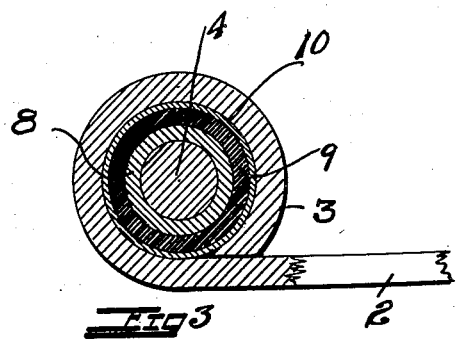
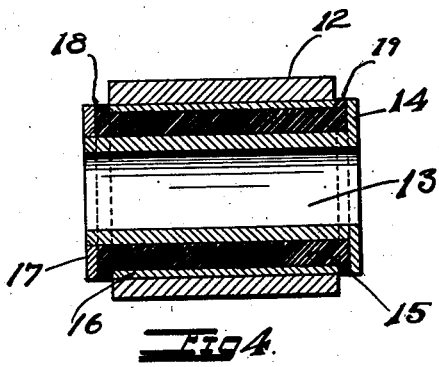
INVENTOR.
Fred C. Morris.
BY
Carlos P. Griffin
ATTORNEY.

Patented May 13, 1930

1,758,712

UNITED STATES PATENT OFFICE

FRED C. MORRIS, OF SAN FRANCISCO, CALIFORNIA

ANTIRATTLING BUSHING

Application filed September 13, 1924. Serial No. 737,623.

This invention relates to a bushing for use in certain places in machinery, especially in connection with automobiles where it is desired to produce a bearing that will be lasting and which will have a certain amount of give without making the structure loose, and which will aid in preventing the rattling of the parts connected.

Another object of the invention is to provide a bushing which can be easily renewed whenever it becomes worn out.

Other objects of the invention will appear as the description proceeds.

An embodiment of the invention is shown in the accompanying drawings in which the same reference numeral is applied to the same portion throughout, but I am aware that there may be modifications thereof.

Figure 1 is a rear elevation of a spring and the end of a frame of an automobile, showing the manner of application of the spring to the frame and in which two of these bushings are used.

Figure 2 is a side elevation of a spring and a portion of the end frame of an automobile, showing the bushings and frame and spring partially in section.

Figure 3 is a slightly enlarged view of the bushing as it appears in transverse section.

Figure 4 is a longitudinally sectional view of a slightly modified form of the bushing.

In the drawings the numeral 1 indicates the frame of the automobile, 2 the spring and 3 that portion of the spring which is turned over to form the eye for the bushing. The spring is ordinarily secured to the frame of the automobile by means of one or more pins; in the present instance two, as indicated at 4 and 5, and these pins form the pivots for two short links 6 and 7.

The bushing consists of a bronze inner shell 8, over which is placed a rubber covering 9, and this rubber covering is in turn covered by a thin steel jacket 10. The two shelves thus formed are vulcanized to the rubber and are used in the same way that an ordinary bushing is used, except that this bushing will allow a certain amount of give to the inner bushing 8 which cannot be allowed if it is forced tightly into a metal spring eye, and this rubber covering also serves to aid in preventing undue wear of the inner bushings and pins. In the form of the invention shown in Figure 4, a portion of the spring eye is illustrated at 12 and the inner bushing 13 has a flange at 14 and is covered with a body of rubber 15, which in turn is vulcanized to the outer steel shell 16 and a washer 17 is forced tightly over the end of the inner bushing 13.

The washer 17 when in place, forms a flange similar to the flange 14, and the bushing is then equivalent to a double flanged bushing. In fact the bushing 13 may have both flanges as integral parts thereof.

It will be seen in this construction that the rubber after being vulcanized to the inner and outer shell will be visible at only two places, as indicated at 18 and 19, and any grease that may work out of the inner shell is thus not likely to work around into the rubber and deteriorate it.

What I claim is as follows, but modifications may be made in carrying out the invention and in the above particularly described form thereof, within the purview of the invention as defined by the annexed claim.

A bearing bushing for motor vehicles comprising a shell, a rubber bushing therein and having its ends projecting beyond the end of the shell and over the periphery thereof, a sleeve passing through said rubber bushing, and flanges on said sleeve at both ends substantially the diameter of the outer shell.

In testimony whereof I have hereunto set my hand this 16th day of August, A. D. 1924.

FRED C. MORRIS.